United States Patent
Visel et al.

(10) Patent No.: US 8,575,549 B2
(45) Date of Patent: Nov. 5, 2013

(54) MACHINE TOOL MONITORING DEVICE

(75) Inventors: Benjamin Visel, Schwiebedingen (DE);
Georg Stellmann, Ludwigsburg (DE);
Sebastian Jackisch, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 433 days.

(21) Appl. No.: 12/664,075

(22) PCT Filed: Jun. 13, 2008

(86) PCT No.: PCT/EP2008/057509
§ 371 (c)(1),
(2), (4) Date: Apr. 15, 2010

(87) PCT Pub. No.: WO2008/152141
PCT Pub. Date: Dec. 18, 2008

(65) Prior Publication Data
US 2010/0200754 A1    Aug. 12, 2010

(30) Foreign Application Priority Data

Jun. 15, 2007  (DE) .......................... 10 2007 027 669
Jan. 14, 2008  (DE) .......................... 10 2008 004 245
Jun. 13, 2008  (DE) .......................... 10 2008 002 431

(51) Int. Cl.
*G01J 5/00*    (2006.01)

(52) U.S. Cl.
USPC ....................................... 250/338.1

(58) Field of Classification Search
USPC ................... 250/338.1–338.5, 340
See application file for complete search history.

(56) References Cited

U.S. PATENT DOCUMENTS

| | | | |
|---|---|---|---|
| 5,436,613 A | 7/1995 | Ghosh et al. | |
| 6,959,631 B2 | 11/2005 | Sako | |
| 7,047,854 B2 | 5/2006 | Sako | |
| 7,110,570 B1 * | 9/2006 | Berenz et al. | 382/104 |
| 2006/0101960 A1 | 5/2006 | Smith et al. | |
| 2006/0197020 A1 | 9/2006 | Trzecieski et al. | |
| 2008/0203307 A1 * | 8/2008 | Determan et al. | 250/341.8 |

FOREIGN PATENT DOCUMENTS

| | | |
|---|---|---|
| CN | 1500604 | 6/2004 |
| DE | 10 2007 039 570 | 3/2008 |
| EP | 1 422 022 | 5/2004 |
| GB | 2 207 999 | 2/1989 |

OTHER PUBLICATIONS

Dowdall et al., "Face detection in the Near-IR spectrum,", 2003, Image and Vision Computing, vol. 21, pp. 565-578.*

* cited by examiner

*Primary Examiner* — Kiho Kim
(74) *Attorney, Agent, or Firm* — Michael J. Striker

(57) ABSTRACT

A machine tool monitoring device includes a detection device (32) for detecting the presence of a type of material, in particular human tissue, in a machine tool area (34) via spectral evaluation of radiation (S). The detection device (32) includes a sensor unit (50) having at least one sensitivity range (64) for detecting radiation in a wavelength range ($WL_2$) located at least partially in the infrared spectrum (72).

10 Claims, 6 Drawing Sheets

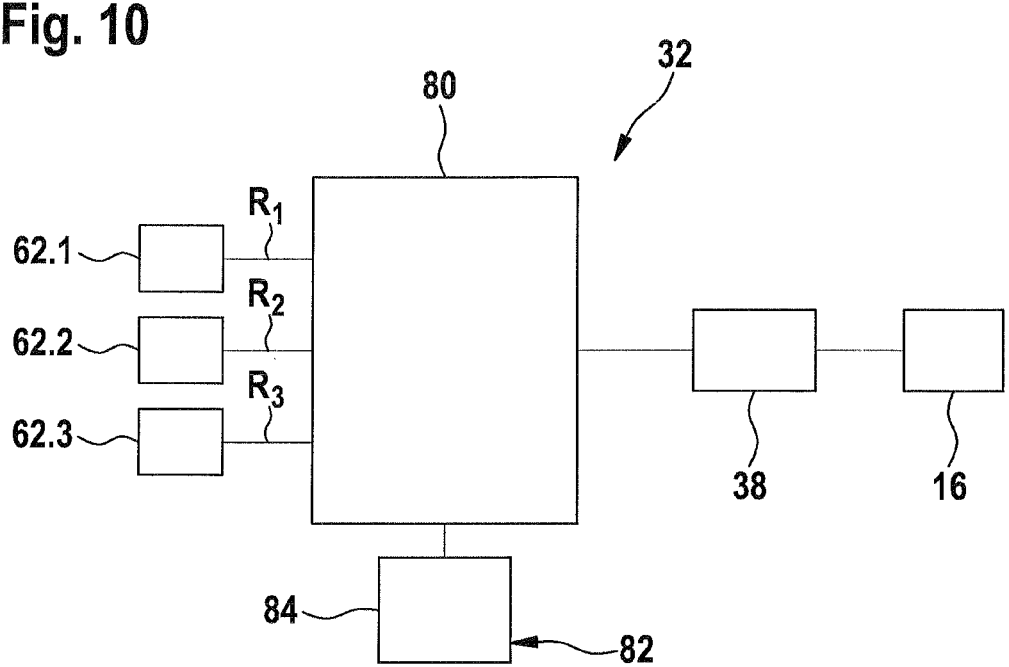

MACHINE TOOL MONITORING DEVICE

CROSS-REFERENCE

The invention described and claimed herein below is also described in PCT/EP2008/067572, filed on Jun. 13, 2008 and DE 10 2007 027 669.0, filed on Jun. 15, 2007, DE 10 2008 004 245.5, filed on Jan. 14, 2008, and 10 2008 002 431.7, filed on Jun. 13, 2008. These German Patent Applications, whose subject matter is incorporated here by reference, provides the basis for a claim of priority of invention under 35 U.S.C. 119 (a)-(d).

BACKGROUND OF THE INVENTION

The present invention is directed to a machine tool monitoring device.

A machine tool monitoring device comprising a detection device for detecting material is already known.

SUMMARY OF THE INVENTION

The present invention is directed to a machine tool monitoring device comprising a detection device that detects the presence of a type of material, in particular human tissue, in a machine tool working region via spectral evaluation of radiation.

It is provided that the detection device includes a sensor unit having at least one sensitivity range for detecting radiation in a wavelength range that is at least partially located in the infrared spectrum. A "machine tool working region" is intended to mean, in particular, a region of a machine tool located in the direct vicinity of a tool. A region located in the "direct" vicinity of the tool is intended to mean, in particular, a region in which every point in the region has the shortest distance to the tool, the distance being a maximum of 10 cm, preferably a maximum of 5 cm, and particularly preferably a maximum of 2 cm. Furthermore, "radiation" in this context refers, in particular, to electromagnetic radiation. A "spectrum" of radiation detected by the sensor unit is intended to mean, in particular, a distribution of a radiation parameter, in particular the intensity of the radiation, as a function of the wavelength, frequency, and/or time. A "wavelength range" is intended to mean a portion of the electromagnetic spectrum that is defined using two quantities: The "wavelength" of the wavelength range refers to its central wavelength, while the "bandwidth" of the wavelength range is its full-width half maximum (FWHM). Furthermore, a "spectral evaluation" of radiation refers, in particular, to a signal evaluation in which an evaluation result is obtained by identifying and processing a characteristic of a spectrum of the radiation, in particular a signal intensity integrated over a wavelength range. Using the embodiment according to the present invention, it is possible to reliably and rapidly detect an application situation of a machine tool in a low-cost manner. Moreover, "human tissue" refers, in particular, to a body part of an unclothed, in particular, human organism, such as skin, fingernails, and/or deeper tissue layers.

To ensure that a machine tool is extremely safe to use, the detection device preferably includes an evaluation means for evaluating radiation detected by the sensor unit; based on the radiation, the evaluation means detects the presence of human tissue in the vicinity of the machine tool.

According to a preferred embodiment of the present invention, the device detects presence via the evaluation of a reflectance spectrum of radiation reflected on an examination object, thereby making it possible to effectively identify the type of material based on contrast detection.

Particularly reliable detection may be attained when the wavelength range is at least partially a near-mid infrared range, in particular a range between approximately 700 nm and 3000 nm. As a result, a sensitivity range may be identified that is tailored to the detection and evaluation of a reflectance spectrum. In this context, a "near-mid infrared range" refers, in particular, to a wavelength interval of the infrared spectrum that is located below the wavelength 15 μm. Moreover, high contrast between human tissue and material may be attained when the sensitivity range detects radiation in a wavelength interval of the infrared spectrum below wavelength 8 μm. It is advantageous, in particular, when the wavelength range is a near infrared range. In this context, a "near infrared range" refers, in particular, to a wavelength interval of the infrared spectrum that is located below the wavelength 3 μm, such as a wavelength interval in the IR-A and IR-B ranges in particular. Furthermore, the wavelength range may be partially located in the visible and/or ultraviolet range of the electromagnetic spectrum.

To detect radiation using the sensor unit that is located exclusively in the wavelength range, it is advantageous, under certain circumstances, to use an optical filter installed in front of the sensor unit to spectrally limit the sensitivity of the sensor unit to the wavelength range. The spectral characteristic of the optical filter that is used typically corresponds to that of a band-pass filter, although it may make sense in isolated cases to use filters having other spectral filter characteristics.

An evaluation signal having a high signal intensity may be obtained when the detection device includes a transmitting unit which transmits radiation, a portion of which at the least is in the wavelength range.

In a further advantageous embodiment of the present invention, which is suited, in particular, to distinguishing between human tissue and materials, the transmitting unit transmits radiation in the wavelength range and in at least one further wavelength range. It is particularly advantageous to use a transmitting unit, the radiation of which is pulsed, in particular such that the time-based characteristic of the pulsed radiation differs in the two wavelength ranges. The advantage of this embodiment is that it makes it possible via the use of the evaluation means to distinguish the radiation received by the sensor unit according to the wavelength ranges emitted by the transmitting unit, and to therefore detect the spectral characteristic of the irradiated material type separately in the two wavelength ranges.

Furthermore, the sensor unit transmits radiation in several wavelength ranges. As a result, the reliability of detection of tissue, in particular human tissue, may be advantageously increased, since the plurality of wavelength ranges and/or wavelengths may be used to perform detection. In addition, different ratios, in particular contrast ratios of radiation detected by a sensor unit and/or the detection device relative to the individual wavelengths and/or wavelength ranges are formed, thereby resulting in a redundant, in particular, detection of a material type or human tissue, which may be required, e.g., as a distinguishing criterium based on a slight distinction between the reflected spectra in order to distinguish between human tissue and a moist workpiece. It is also possible, in particular, to cover a broad spectral range, using which it is possible to distinguish between the largest possible number of material types and human tissue.

In a particularly advantageous embodiment, the radiation emitted by the transmitting unit is "pulsed", which means that the emitted radiation is modulated regularly over time. By using the evaluation means, and with consideration for the characteristic of time-based modulation of the radiation emitted by the transmitting unit, it is possible to clearly distinguish the radiation received by the sensor unit from other types of electromagnetic radiation present in the surroundings, thereby making it possible to markedly increase the signal-to-noise ratio. A further considerable advantage of this embodiment is that optical filters used to limit the wavelength range received by the sensor unit may typically be eliminated.

Furthermore, the transmitting unit transmits radiation of different wavelengths, each of which has a different pulse frequency in particular. In this context, a "pulse frequency" refers, in particular, to a frequency at which a signal, in particular a signal to be transmitted, is pulsed. In this manner it is advantageously possible to distinguish between the individual wavelength ranges and/or the individual wavelengths of the sensed spectrum using the evaluation means. In addition, the machine tool monitoring device may be formed in a particularly low-cost manner by typically eliminating additional optical filters used to distinguish between the spectra that are detected. The pulse frequency may advantageously have a value between 25 Hz and 1 GHz. Particularly advantageously, the pulse frequencies of the different wavelengths and/or wavelength ranges each differ by a factor of two or a multiple thereof, e.g., pulse frequencies of 10 kHz, 20 kHz, and 40 kHz when there are exactly three wavelengths and/or wavelength ranges.

Furthermore, the radiation of the at least one further wavelength range is in the visible spectral range and/or in the ultraviolet spectral range. Advantageously, the spectral range for detecting or identifying a material type and/or human tissue may be expanded, and additional characteristic wavelength ranges may be detected in order to distinguish and/or identify the material type and/or human tissue.

The machine tool monitoring device likewise includes an optics unit that defines a reaction region of the detection device. A "reaction region" of the detection device refers, in particular, to a spacial region that is assigned to a procedure that may be carried out by the detection device; the procedure is trigger when a body having the material type is present in this spacial region. The reaction region preferably corresponds to at least one subregion of the machine tool working region. As an alternative or in addition thereto, a reaction region may be provided that differs from the machine tool working region. For example, this reaction region may be associated with a warning function of the machine tool monitoring device. Advantageously, the detection device is operatively connected to an actuator unit which actuated, e.g., to stop a machine tool drive unit, when the body having the material type is present in the reaction region. The optics unit may be an optical system installed in the radiation path of the sensor unit. If the machine tool monitoring device includes a transmitting unit for transmitting radiation, the optics unit may be—as an alternative, or in addition thereto—an optical system installed in the radiation path of the transmitting unit. Via the optics unit, a machine tool may be used in a reliable, convenient manner given that a reaction of the detection device may be limited to a limited range.

Advantageously, the sensor unit has at least one further sensitivity range which is used to detect radiation in a further wavelength range, thereby making it possible to further increase the reliability of the identification of the material type. The wavelength ranges may overlap.

In this context it is provided that the detection device includes an evaluation means that detects the presence of the material type based on a relationship between at least two radiation parameters, each of which is assigned to a portion of radiation in a different wavelength range. Rapid detection may be advantageously attained as a result. In particular, the use of reference radiation may be eliminated. A "radiation parameter" refers, in particular, to a parameter that is measured via radiation that is received by the sensor unit. This parameter may be an electrical parameter in particular.

In a preferred embodiment of the present invention, it is provided that the wavelength range is narrowband. In this context, a "narrowband wavelength range" refers, in particular, to a wavelength range that has a maximum bandwidth of 200 nm, or advantageously a maximum bandwidth of 50 nm, preferably a maximum bandwidth of 20 nm, and particularly preferably a maximum of 10 nm. As a result, it is advantageously possible to eliminate an elaborate filtering of radiation that is detected. Bandwidths in a range of up to 1 μm are also basically possible.

Furthermore, operator comfort may be advantageously increased when the machine tool monitoring device includes a marking unit that marks the reaction region. In a particularly advantageous embodiment, the marking device is composed of an optical unit for irradiating the reaction region with visible light.

To expand the reaction region and/or to more reliably distinguish between human tissue and material, embodiments of the present invention are advantageous in which the detection unit includes more than one transmitting unit and/or more than one receiving unit, which may be installed entirely separately from one another.

BRIEF DESCRIPTION OF THE DRAWINGS

Further advantages result from the description of the drawings that follow. Exemplary embodiments of the present invention are shown in the drawings. The drawings, the description, and the claims contain numerous features in combination. A person skilled in the art will also advantageously consider the features individually and combine them to form further reasonable combinations.

FIG. 10 shows an internal circuit of the detection device, and FIG. 11 shows a database stored in the detection device.

DETAILED DESCRIPTION OF THE EXEMPLARY EMBODIMENTS

Figure 1:
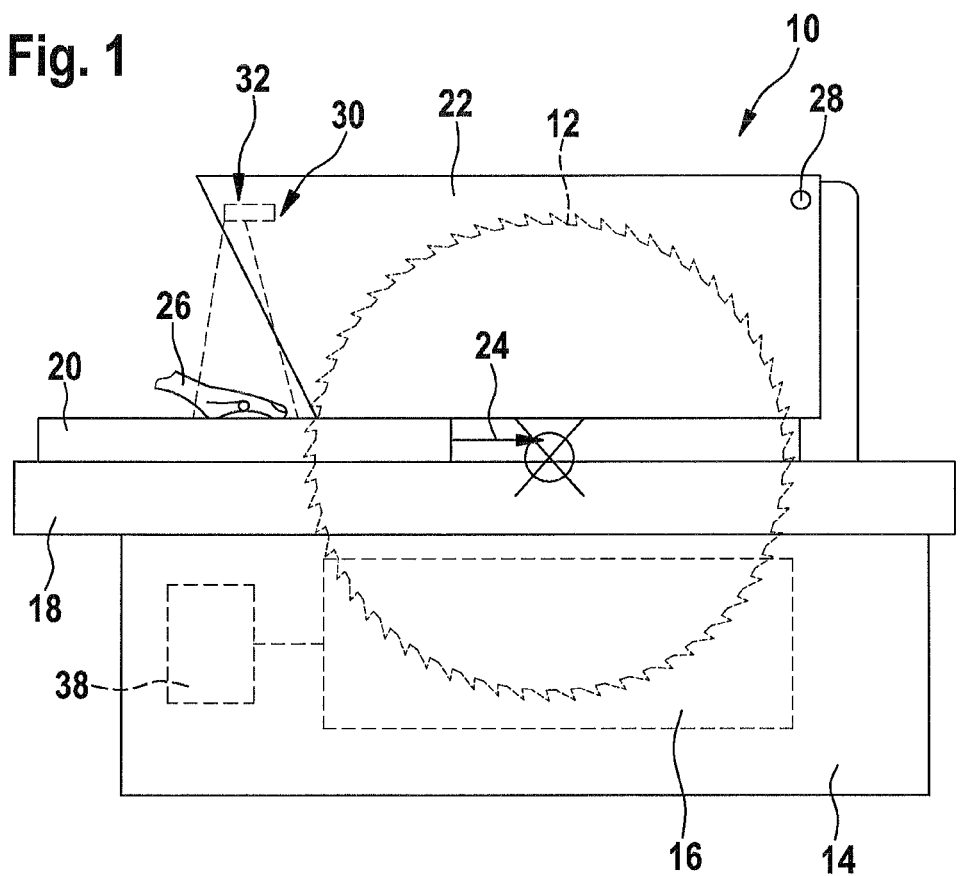
FIG. 1 shows a side view of a table-top circular saw comprising a detection device.

FIG. 1 shows a machine tool 10 designed as a table-top circular saw, in a side view. Machine tool 10 includes a tool 12 designed as a disk-shaped saw blade which is driven in a rotating manner via a drive unit 16 which is designed as an electric motor and is located in a drive housing 14. A saw table 18, on which a workpiece 20 to be machined may be placed, is supported on drive housing 14. To protect an operator, machine tool 10 includes a guard 22 which completely encloses the portion of tool 10 extending out of saw table 18 when machine tool 10 is in a non-operating state. In order to machine workpiece 20, an operator moves workpiece 20 in a working direction 24 toward tool 12 in a known manner; a hand 26 of an operator is depicted schematically in FIG. 1. Guard 22, which is supported such that it may pivot about an axis of rotation 28, is swiveled upward by workpiece 20, thereby exposing the cutting edge of the tool.

To increase operator safety, machine tool 10 is provided with a machine tool monitoring device 30. Machine tool monitoring device 30 includes a detection device 32 which detects the presence of human tissue in a machine tool monitoring region 34 of machine tool 10 via a spectral evaluation of radiation. Machine tool working region 34 is shown from above in FIG. 2, in a top view of machine tool 10. Guard 22 is not shown in FIG. 2, to enhance clarity. Detection device 32 has a reaction region 36 assigned to the actuation of an actuator unit 38 which is coupled to drive unit 16 and is operatively connected to detection device 32 (see also FIG. 10). If detection device 32 detects the presence of human tissue in reaction region 36, an actuating signal is transmitted to actuator unit 38 which, based on this actuating signal, brings drive unit 16 to a standstill. Reaction region 36 substantially corresponds to machine tool working region 34 which is located in front of, next to, and behind tool 12, as viewed in working direction 24. In the example shown, detection device 32 is located in guard 22, and, in fact, in the front region of guard 22, which is located in front of tool 12 relative to working direction 24.

Figure 2:
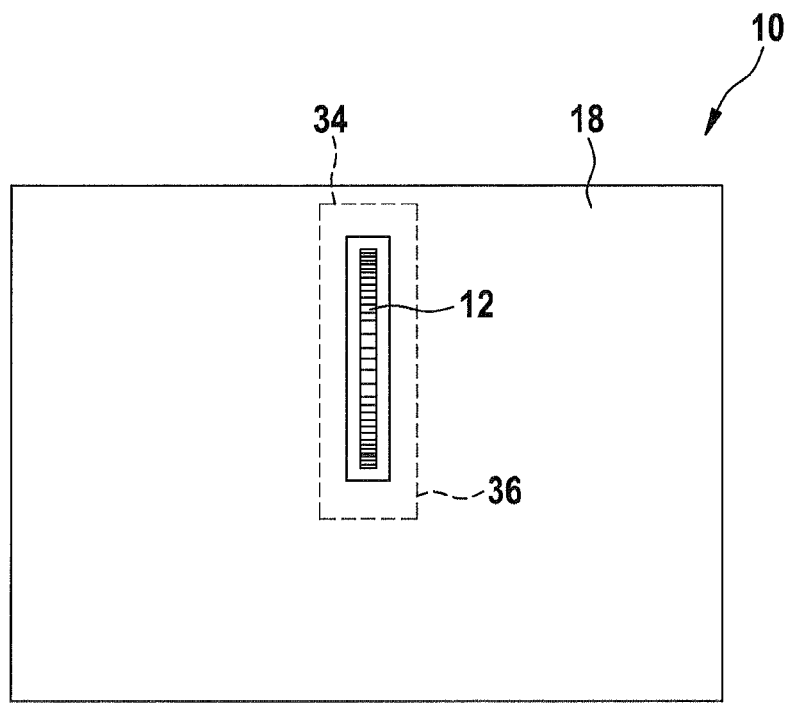
FIG. 2 shows a top view of the table-top circular saw, including a reaction region of the detection device.
Figure 3:
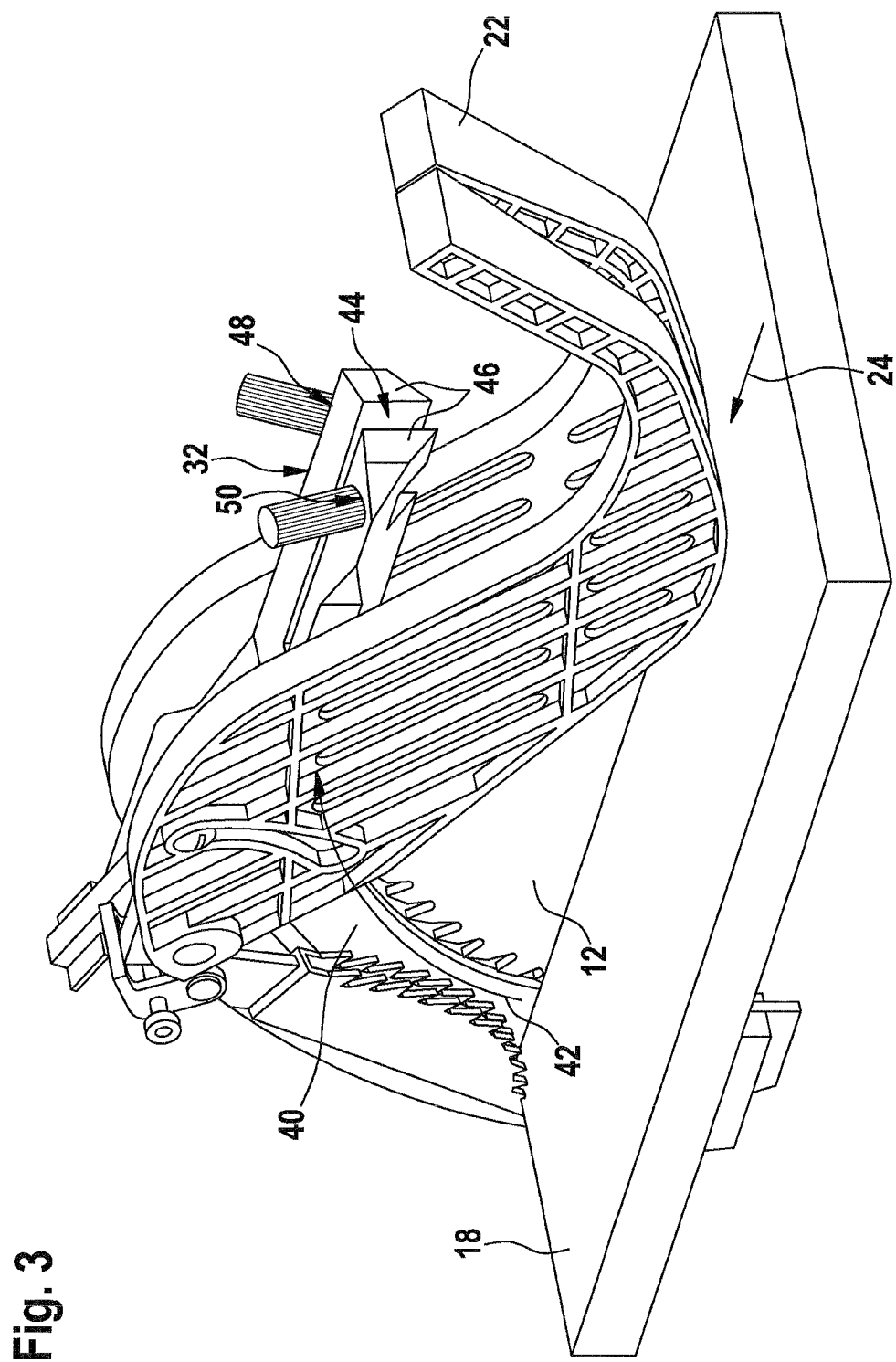
FIG. 3 shows an alternative placement of a sensor unit of the detection device on the table-top circular saw, in a perspective view.

FIG. 3 shows a placement of detection device 32 within the table-top circular saw, as an alternative to FIGS. 1 and 2. The table-top circular saw includes a spreader wheel 40 that is located around tool 12 in circumferential direction 42. Guard 22 includes an arm 44, on the front end of which—which points opposite to drive direction 24—detection device 32 is located. Arm 44 includes two peg-shaped extensions 46 on which detection device 32 is located; a transmitting unit 48 and a sensor unit 50 are located in one peg-shaped extension 46 in each case, and are therefore located within spreader wheel 40 such that they are spacially separated from one another.

Figure 4:
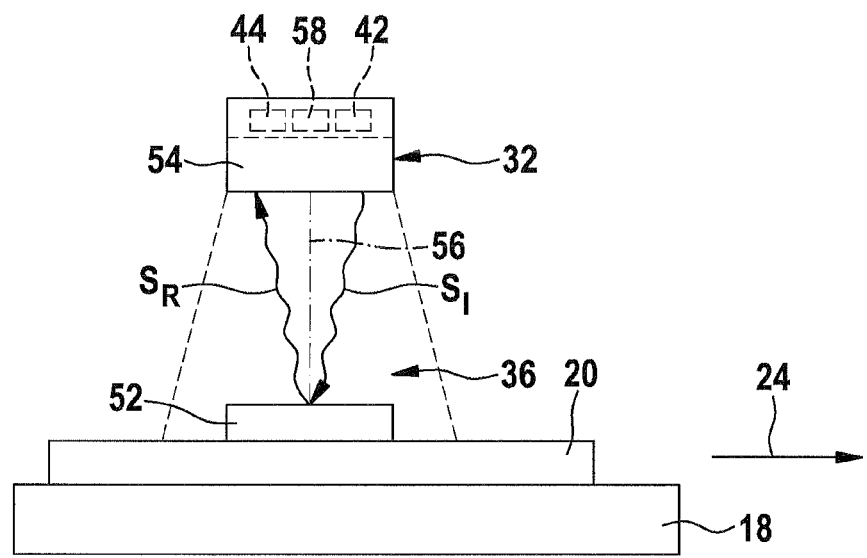
FIG. 4 shows a schematic depiction of the detection device comprising a transmitting unit for transmitting radiation into the reaction region, a sensor unit, and an examination object, FIG. 5 shims a transmitting means of the transmitting unit, and a sensor means of the sensor unit, in a front view.

The operating method of detection device 32 is described in greater detail with reference to FIG. 4. Saw table 18, workpiece 20, and detection device 32 are depicted in a schematic view. Neither tool 12 nor guard 22 are shown, to enhance clarity. An examination object 52 is located on workpiece 20 in reaction region 36. Examination object 52 may be hand 26 in particular. Detection device 32 includes transmitting unit 48, which is depicted schematically in FIG. 4, and which transmits radiation $S_I$ into reaction region 36. Radiation $S_I$ is reflected on examination object 52, and is received as radiation $S_R$ by a sensor unit 50 of detection device 32, which is depicted schematically in FIG. 4. An optics unit 54 is installed upstream of transmitting unit 48 and sensor unit 50. Optics unit 54 includes a lens unit (not depicted) which defines the limits of reaction region 36, into which radiation $S_I$ is transmitted. Furthermore, the lens unit is designed to limit the sensitivity of sensor unit 50 to radiation $S_R$ reflected in reaction region 36. Optics unit 54 has an optical axis 56. Machine tool monitoring device 30 furthermore includes a marking unit 58 which is depicted schematically in FIG. 3, and which, during operation of detection device 32, marks reaction region 36 of detection device 32 via a projection onto saw table 18 that is visible to an operator, e.g., using colored light. For example, marking unit 58 may be designed as a laser marker. As an alternative or in addition thereto, the marking of reaction region 36 may be carried out by transmitting unit 48 which generates a portion of radiation in the visible range.

Figure 5:
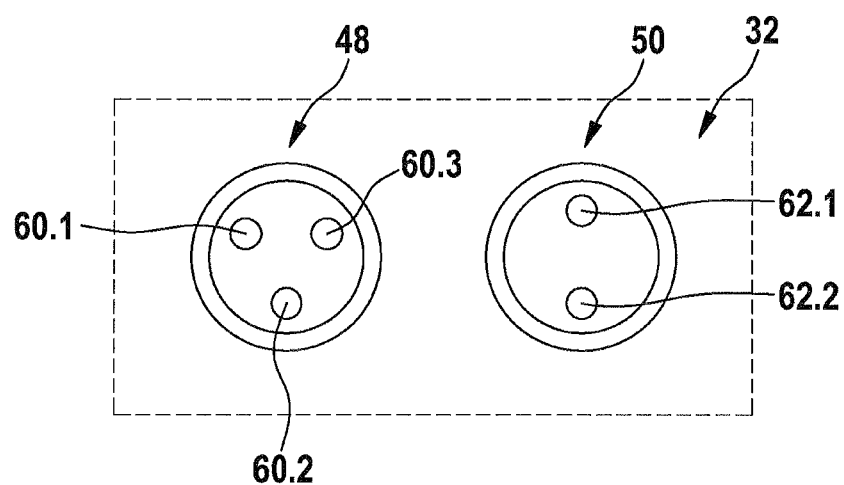
Figure 6:
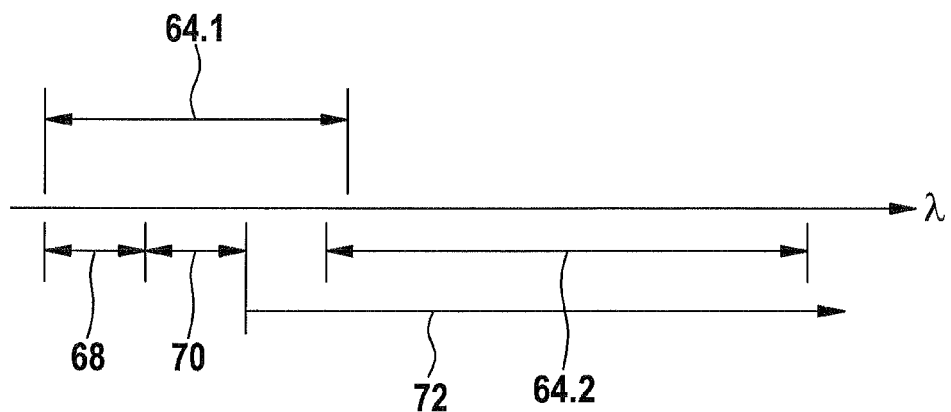
FIG. 6 shows sensitivity ranges of the sensor means.

FIG. 5 shows transmitting unit 48 and sensor unit 50 of detection device 32 in a front view, in which optical axis 56 intersects the plane of the drawing. Transmitting unit 48 includes three transmitting means 60.1, 60.2, 60.3, each of which is an LED. Sensor unit 50 includes two sensor means 62.1, 62.2 which have different sensitivity ranges 64.1, 64.2 (FIG. 6); sensitivity ranges 64.1, 64.2 may overlap at least partially. Sensor means 62.1, 62.2 are each formed by a photodiode. It is basically also feasible for sensor unit 50 to include a sensor means that covers or detects an entire wavelength range emitted by transmitting means 60.1, 60.2, 60.3.

Figure 7:
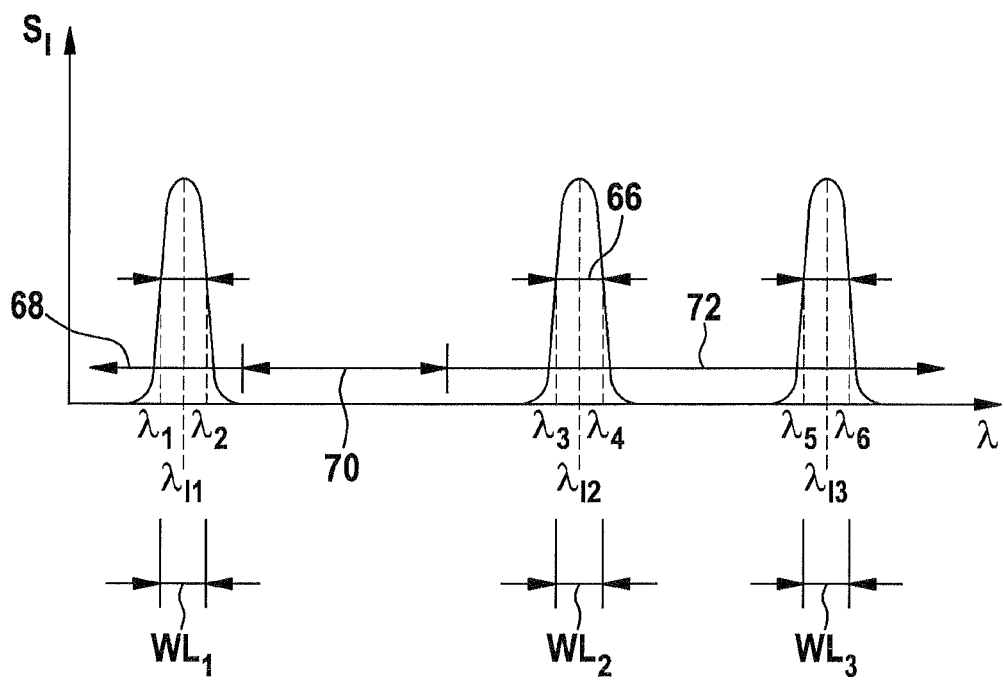
FIG. 7 shows a depiction of wavelength ranges of the transmitting means.

Transmitting means 60.1, 60.2, 60.3 each transmit radiation $S_I$ having a central wavelength $\lambda_{I1}, \lambda_{I2}, \lambda_{I3}$, respectively, in a narrowband wavelength range $WL_1=[\lambda_1, \lambda_2]$, $WL_2=[\lambda_3, \lambda_4]$, $WL_3=[\lambda_5, \lambda_6]$, respectively; individual wavelength ranges $WL_1, WL_2, WL_3$ differ from one another. Narrowband wavelength ranges $WL_1, WL_2, WL_3$ have a bandwidth 66 of approximately 50 nm. Bandwidths 66 of individual wavelength ranges $WL_1, WL_2, WL_3$ may also have different forms. As an alternative, transmitting means 60.1, 60.2, 60.3 may also be formed by a laser, a fluorescent tube, and/or further transmitting means 60 that appear reasonable to a person skilled in the art. In addition, transmitting unit 48 may include a transmitting means 60 which outputs radiation in different wavelengths $WL_1, WL_2, WL_3$. Transmitting unit 48 emits radiation in three wavelength ranges $WL_1, WL_2, WL_3$, in particular having exactly three wavelengths $\lambda_{I1}, \lambda_{I2}, \lambda_{I3}$ (FIG. 7). Furthermore, transmitting unit 48 emits radiation $S_I$ in a pulsed manner in wavelength ranges $WL_1$ through $WL_3$. At least two of the wavelength ranges $WL_1, WL_2, WL_3$ are located in infrared spectrum 72. In particular, one or two or three of the wavelength ranges $WL_1, WL_2, WL_3$ is/are a range of the near infrared spectrum 1R-A having limit values [700 nm, 1400 nm]. As an alternative or in addition thereto, wavelength ranges in infrared ranges IR-B (1.4-3 μm) and IR-C (3-15 μm) may be chosen. Transmitting unit 48 comprising transmitting means 60.1, 60.2, 60.3 generates radiation $S_I$ which has wavelength ranges $WL_1$ depicted in FIG. 7. Furthermore, one of the wavelength ranges $WL_1$ or one of the central wavelengths $\lambda_{I1}$ may be located in a visible spectral range 70 or in ultraviolet spectral range 68.

Wavelength ranges $WL_1, WL_2, WL_3$ of transmitting means 60.1, 60.2, 60.3 may differ in different embodiments of machine tool monitoring device 30. If the aim is merely to distinguish a dry workpiece 20 from human tissue, wavelengths $\lambda_{I1}, \lambda_{I2}, \lambda_{I3}$ having values $\lambda_{I1}$=450 nm, $\lambda_{I2}$=740 nm, and $\lambda_{I3}$=1450 nm, or $\lambda_{I1}$=740 nm, $\lambda_{I2}$=840 nm, and $\lambda_{I3}$=1550 nm are advantageous. It is also feasible to consider using only two of the transmitting means 60.1, 60.2, 60.3 to distinguish between a dry workpiece 20 and human tissue, e.g., wavelengths $\lambda_{I1}, \lambda_{I2}$, in which $\lambda_{I1}$=740 nm and $\lambda_{I2}$=1450 nm, $\lambda_{I1}$=740 nm and $\lambda_{I2}$=1550 nm, or $\lambda_{I1}$=1075 nm and $\lambda_{I2}$=1375 nm. If the aim is to distinguish a moist and/or dry workpiece 20 and human tissue, wavelengths $\lambda_{I1}, \lambda_{I2}, \lambda_{I3}$ may have values $\lambda_{I1}$=375 nm, $\lambda_{I2}$=740 nm and $\lambda_{I3}$=1550 nm, or $\lambda_{I1}$=375 nm, $\lambda_{I2}$=1075 nm and $\lambda_{I3}$=1375 nm. To ensure that human tissue and workpieces 20 are reliably distinguished, it may also be advantageous to use or emit wavelength ranges $WL_1, WL_2, WL_3, WL_4$ or four central wavelengths $\lambda_{I1}, \lambda_{I2}, \lambda_{I3}, \lambda_{I4}$. Of particular interest are central wavelengths $\lambda_{I1}, \lambda_{I2}, \lambda_{I3}, \lambda_{I4}$, in which $\lambda_{I1}$=375 nm, $\lambda_{I2}$=740 nm, $\lambda_{I3}$=1550 nm, and a fourth central wavelength in a range between 400 nm and 600 nm, such as $\lambda_{I4}=470$ nm or $\lambda_{I4}=525$ nm. Basically, any other wavelength combination may be used that is suitable for use to distinguish material types in the spectral range described, and that appears reasonable to a person skilled in the art.

Sensor means 62.1, 62.1 each has a different sensitivity range 64.1, 64.2 (FIG. 6); sensitivity ranges 64.1, 64.2 detect radiation in entire wavelength ranges $WL_1$, $WL_2$, $WL_3$ emitted by transmitting unit 48. In order to perform narrowband filtering of detected radiation $S_R$, sensor unit 50 may be provided with sensor means 62.1, 62.2 as well as a system of filter components, which is installed upstream of sensor means 62.1, 62.2. As an alternative or in addition to photodiodes, sensor means 62.1, 62.2 may also be designed as fields of photosensitive elements.

Figure 8:
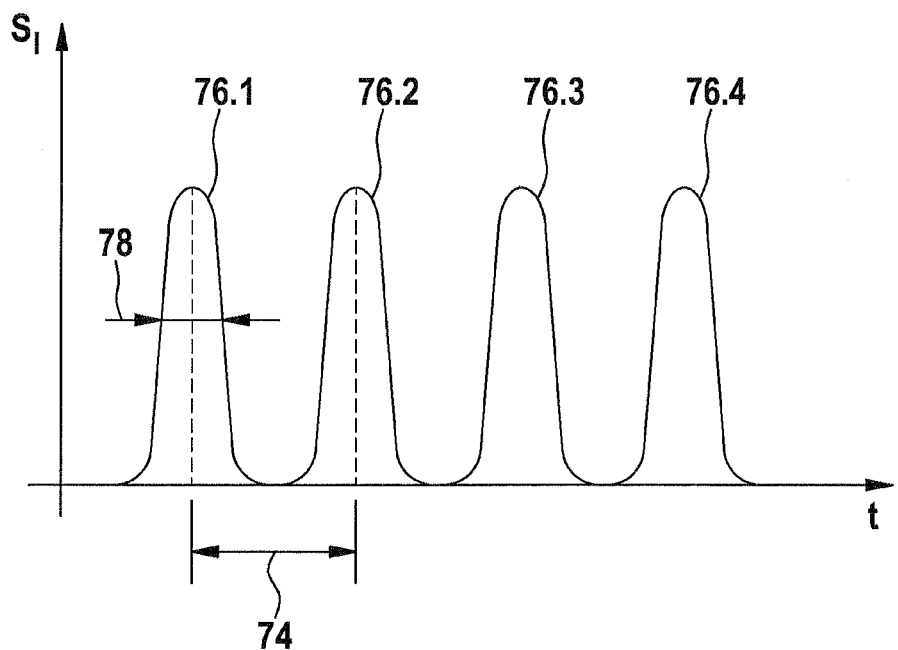
FIG. 8 is a depiction of pulsed radiation emitted by a transmitting means.

Transmitting means 60.1, 60.2, 60.3 also transmit pulsed—in particular regularly pulsed—radiation $S_I$ or radiation $S_I$ having a variable intensity for particular wavelength ranges $WL_1$, $WL_2$, $WL_3$ in reaction range 36 (FIG. 8), thereby making it possible to distinguish, within sensor unit 50, radiation $S_I$ emitted by individual transmitting means 60.1, 60.2, 60.3, and radiation $S_R$ reflected by human tissue, and/or workpiece 20. Pulse frequencies 74 of pulses 76.1, 76.2, 76.3, 76.4 for individual wavelength ranges $WL_1$, $WL_2$, $WL_3$ or wavelengths $\lambda_{I1}, \lambda_{I2}, \lambda_{I3}$ of transmitting means 60.1, 60.2, 60.3 are configured differently from one another in this case. A time-based characteristic of radiation $S_I$ emitted by individual transmitting means 60.1, 60.2, 60.3 is independent for each of the different wavelength ranges $WL_1$, $WL_2$, $WL_3$ or central wavelengths $\lambda_{I1}, \lambda_{I2}, \lambda_{I3}$. In this case, pulse frequencies 74 of individual wavelength ranges $WL_1$, $WL_2$, $WL_3$ or wavelengths $\lambda_{I1}, \lambda_{I2}, \lambda_{I3}$ each differ by a factor of 2, e.g., a pulse frequency 74 of 10 kHz at wavelength $\lambda_{I1}$, a pulse frequency of 20 kHz at wavelength $\lambda_{I2}$, and a pulse frequency of 40 kHz at wavelength $\lambda_{I3}$. A pulse 74 has a width 78 of approximately 100 μs. It is also feasible for one or more transmitting means 60.1, 60.2, 60.3 to emit radiation $S_I$ having a radiation intensity that is constant over time.

Figure 9:
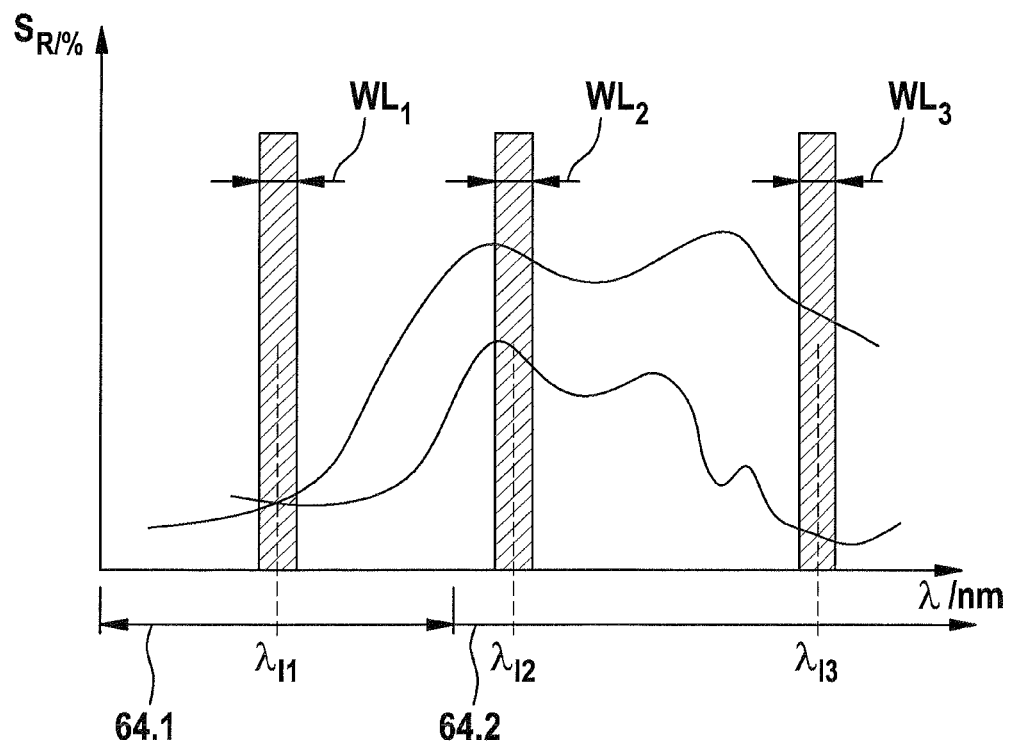
FIG. 9 is a depiction of a spectrum received by the sensor unit.

The principle according to which the presence of human tissue is detected via the evaluation of a reflectance spectrum of radiation $S_R$ reflected on the examination object in reaction region 36 of detection device 32 is explained with reference to FIGS. 9, 10 and 11. FIG. 9 shows the reflectance spectrum of radiation $S_R$ that was reflected on examination object 52 and detected by sensor means 62.1, 62.2. This reflectance spectrum corresponds to the distribution of signal intensity depending on wavelength A of radiation $S_R$. Sensor means 62.1, 62.2 or their sensitivity ranges 64.1, 64.2 each detect a portion of the reflectance spectrum having corresponding wavelength ranges $WL_1$, $WL_2$, $WL_3$ of emitted radiation $S_I$; wavelength ranges $WL_1$, $WL_2$, $WL_3$ are selected out of the reflectance spectrum due to the pulsing. Sensor means 62.1, 62.2 each generate, at their output terminals, a reflectance parameter $R_1$ which is electrical voltage or electrical current (FIG. 10). Reflectance parameter $R_1$, for example, is proportional to the signal intensity of radiation $S_R$ integrated over wavelength range $WL_I$ and depicted as shaded regions in FIG. 9.

As shown in FIG. 10, reflectance parameters $R_I$ are given at an input of an evaluation means 80 of detection device 32. In a further variant, it is likewise feasible for reflectance parameters $R_I$ to be amplified. Based on pulsed radiation $S_I$ emitted by transmitting unit 48, detected radiation $S_R$ may be assigned to individual wavelength ranges $WL_1$, $WL_2$, $WL_3$ within detection device 32, in particular in evaluation means 80. Evaluation means 80 may include a synchronous demodulator and/or a further circuit for lock-in detection, via which transmitting unit 48 and sensor unit 50 are linked, and received radiation $S_R$ is thereby assigned to individual wavelength ranges $WL_1$, $WL_2$, $WL_3$. In particular, a signal-to-noise ratio may also be increased. Based on reflectance parameter $R_I$, a radiation parameter $V_I$ is formed in evaluation means 80, which is assigned to one of the wavelength ranges $WL_1$, $WL_2$, $WL_3$ emitted by transmitting unit 48. When an evaluation is carried out, radiation parameters $V_I$ are compared using logical operations to values in a database 84 stored in a memory unit 82 of detection device 32. Database 84 is depicted schematically in FIG. 11. In a first evaluation strategy, detected radiation parameters $V_I$ are compared to stored values $A_1, A_2, A_3$. A detection variable, which takes on the values "False" (F) or "True" (T), is assigned to every pair $(V_I, A_I)$. If the value is "F", the presence of human tissue in reaction region 36 is ruled out. In a second, alternative or additional evaluation strategy, evaluation means 80 determines ratios $V_1/V_2$; $V_1/V_3$; $V_2/V_3$ of various radiation parameters $V_I$. These ratios are compared to stored values $A_1, A_2, A_3$, etc., and it may thereby be concluded, as described above, that human tissue is present in reaction region 36. Via the determination of ratios, detection may be carried out in a manner that is independent of intensity and, in particular, independent of distance. In addition, information on the spectral sensitivity of sensor means 62.1, 62.2 and the spectral radiation characteristics of transmitting unit 60.1, 60.2, 60.3, which may be used to evaluate radiation parameters $V_1$, may be stored in memory unit 82.

Detection device 32 described here is an analog detection device in which reflected radiation $S_R$ is detected and evaluated exclusively in an analog manner. A combined

What is claimed is:

1. A machine tool monitoring device, comprising:
a detection device (32) for detecting the presence of a type of material, in particular human tissue, in a machine tool area (34) via spectral evaluation of radiation (S), wherein the detection device (32) includes a sensor unit (50) having at least one sensitivity range (64) for detecting radiation in a wavelength range ($WL_2$) located at least partially in the infrared spectrum (72),
wherein the detection device (32) includes a transmitting unit (48) which transmits radiation, a portion of which at the least is in the wavelength range ($WL_2$), and in at least one further wavelength range ($WL_1$, $WL_3$, $WL_4$), and wherein the radiation of the at least one further wavelength range ($WL_1$) is in the ultraviolet spectral range (68), and wherein the transmitting unit (48) transmits radiation in at least one wavelength range ($WL_1$, $WL_2$, $WL_3$, $WL_4$) in a pulsed manner.

2. The machine tool monitoring device as recited in claim 1, wherein the detection device (32) detects presence via the evaluation of a reflectance spectrum of radiation ($S_R$) reflected on an examination object.

3. The machine tool monitoring device as recited in claim 1, wherein the wavelength range ($WL_2$) is a near-mid infrared range, in particular a range between approximately 700 nm and 3000 nm.

4. The machine tool monitoring device as recited in claim 1, further comprising an optics unit (54) that defines a reaction region (36) of the detection device (32).

5. The machine tool monitoring device as recited in claim 1, wherein the sensor unit (50) includes at least one further sensitivity range (64) that detects radiation in a further wavelength range ($WL_1$).

6. The machine tool monitoring device as recited in claim 1, wherein the detection device (32) includes an evaluation unit (80) which detects the presence of the type of material depending on a ratio of at least two radiation parameters ($V_1$, $V_2$, $V_3$).

7. The machine tool monitoring device as recited in claim 6, wherein the at least two radiation parameters ($V_1$, $V_2$, $V_3$) are each assigned to a portion of radiation in a different wavelength range ($WL_1$, $WL_2$, $WL_3$).

8. The machine tool monitoring device as recited in claim 1, wherein at least one wavelength range ($WL_1$, $WL_2$, $WL_3$) is narrowband.

9. The machine tool monitoring device as recited in claim 1, wherein the detection device (32) includes at least two transmitting units (48) and/or at least two receiving units (50).

10. A machine tool, in the form of a cutting or sawing tool, which includes a machine tool monitoring device, said machine tool monitoring device comprising a detection device (32) for detecting the presence of a type of material, in particular human tissue, in a machine tool area (34) via spectral evaluation of radiation (S), wherein the detection device (32) includes a sensor unit (50) having at least one sensitivity range (64) for detecting radiation in a wavelength range ($WL_2$) located at least partially in the infrared spectrum (72),
wherein the detection device (32) includes a transmitting unit (48) which transmits radiation, a portion of which at the least is in the wavelength range ($WL_2$) and in at least one further wavelength range ($WL_1$, $WL_3$, $WL_4$), and wherein the radiation of the at least one further wavelength range ($WL_1$) is in the ultraviolet spectral range (68), and wherein the transmitting unit (48) transmits radiation in at least one wavelength range ($WL_1$, $WL_2$, $WL_3$, $WL_4$) in a pulsed manner.

* * * * *